(12) United States Patent
Leaback (10) Patent No.: US 7,505,080 B2
(45) Date of Patent: Mar. 17, 2009

(54) MOTION COMPENSATION DEINTERLACER PROTECTION

(75) Inventor: Peter David Leaback, London (GB)

(73) Assignee: Imagination Technologies Limited, Kings Langley, Hertfordshire (GB)

(*) Notice: Subject to any disclaimer, the term of this patent is extended or adjusted under 35 U.S.C. 154(b) by 432 days.

(21) Appl. No.: 10/953,332

(22) Filed: Sep. 29, 2004

(65) Prior Publication Data

US 2005/0206786 A1    Sep. 22, 2005

(51) Int. Cl.
H04N 7/01       (2006.01)
H04N 11/20      (2006.01)
H04N 5/14       (2006.01)
H04N 9/64       (2006.01)

(52) U.S. Cl. .................. 348/452; 348/448; 348/699

(58) Field of Classification Search ............ 348/448, 348/451, 452, 699
See application file for complete search history.

(56) References Cited

U.S. PATENT DOCUMENTS

| | | | | |
|---|---|---|---|---|
| 5,600,377 A * | 2/1997 | David et al. | ........... | 348/452 |
| 5,610,662 A * | 3/1997 | Hackett | ........... | 348/452 |
| 5,619,272 A | 4/1997 | Salmon et al. | | |
| 5,642,170 A * | 6/1997 | Hackett et al. | ........... | 348/459 |
| 5,661,525 A * | 8/1997 | Kovacevic et al. | ........... | 348/452 |
| 5,784,114 A * | 7/1998 | Borer et al. | ........... | 348/452 |
| 5,943,099 A * | 8/1999 | Kim | ........... | 348/448 |
| 5,995,154 A * | 11/1999 | Heimburger | ........... | 348/448 |
| 6,141,056 A * | 10/2000 | Westerman | ........... | 348/448 |
| 6,262,773 B1 * | 7/2001 | Westerman | ........... | 348/448 |
| 6,414,719 B1 * | 7/2002 | Parikh | ........... | 348/448 |
| 6,421,090 B1 * | 7/2002 | Jiang et al. | ........... | 348/452 |
| 6,442,203 B1 * | 8/2002 | Demos | ........... | 375/240.16 |
| 6,459,455 B1 * | 10/2002 | Jiang et al. | ........... | 348/452 |
| 6,501,794 B1 * | 12/2002 | Wang et al. | ........... | 375/240.08 |
| 6,519,369 B1 * | 2/2003 | Kondo et al. | ........... | 382/261 |
| 6,532,264 B1 * | 3/2003 | Kahn | ........... | 375/240.16 |
| 6,577,345 B1 * | 6/2003 | Lim et al. | ........... | 348/452 |
| 6,614,485 B2 * | 9/2003 | Shin et al. | ........... | 348/452 |
| 6,822,691 B1 * | 11/2004 | Kim et al. | ........... | 348/452 |
| 6,924,844 B2 * | 8/2005 | Kawamura et al. | ........... | 348/448 |

(Continued)

FOREIGN PATENT DOCUMENTS

EP          0192292  A1      8/1986

(Continued)

OTHER PUBLICATIONS

United Kingdom Search Report dated Jul. 21, 2004 (5 pages).

*Primary Examiner*—Brian P Yenke
(74) *Attorney, Agent, or Firm*—Flynn, Thiel, Boutell & Tanis, P.C.

(57) ABSTRACT

A motion compensation deinterlacer for producing a progressive scan signal from an interlaced signal includes a motion compensation unit that derives missing lines in an interlaced field from at least one other field in the interlaced signal. The deinterlacer includes a device that derives a first confidence measure for the accuracy of the motion compensation unit using known lines of the field for which missing lines are to be derived. Another device derives a second confidence measure for the accuracy of the motion compensation unit using known lines of at least two other fields. The first and second confidence measures are combined. An output unit selects outputs for display from at least the motion compensation unit and one other deinterlacing device in dependence on the combined confidence measures.

19 Claims, 7 Drawing Sheets

U.S. PATENT DOCUMENTS

| | | | |
|---|---|---|---|
| 7,042,512 B2 * | 5/2006 | Yang et al. | 348/452 |
| 7,057,665 B2 * | 6/2006 | Jung et al. | 348/452 |
| 7,095,445 B2 * | 8/2006 | Kim et al. | 348/448 |
| 7,098,957 B2 * | 8/2006 | Kim et al. | 348/452 |
| 7,194,034 B2 * | 3/2007 | Briand et al. | 375/240.16 |
| 7,265,791 B2 * | 9/2007 | Song et al. | 348/448 |
| 2001/0015768 A1 * | 8/2001 | Shin et al. | 348/452 |
| 2002/0036705 A1 * | 3/2002 | Lee et al. | 348/459 |
| 2002/0180884 A1 * | 12/2002 | Kondo et al. | 348/452 |
| 2002/0196362 A1 * | 12/2002 | Yang et al. | 348/452 |
| 2004/0070686 A1 * | 4/2004 | Jung et al. | 348/448 |
| 2004/0207753 A1 * | 10/2004 | Jung | 348/452 |
| 2004/0207754 A1 * | 10/2004 | Choi et al. | 348/452 |
| 2004/0233327 A1 * | 11/2004 | Yeh et al. | 348/452 |
| 2004/0257467 A1 * | 12/2004 | Nicolas | 348/452 |

FOREIGN PATENT DOCUMENTS

| | | |
|---|---|---|
| EP | 0697788 A2 | 2/1996 |
| WO | WO 01/74082 A1 | 10/2001 |

* cited by examiner

MOTION COMPENSATION DEINTERLACER PROTECTION

This invention relates to a motion compensation deinterlacer.

Deinterlacing is a term used to describe the process of turning an interlaced video sequence or signal into a progressive video sequence or signal. An interlaced video sequence comprises successive fields of video displayed on alternate lines of a display, i.e. a first field which will be displayed on the odd lines and a second field which will be displayed on the even lines, followed by a further first field displayed on the odd lines. Therefore, an interlaced video sequence is one where only half the lines of a frame are transmitted at a time. Effectively this means that each picture is transmitted twice, firstly on the odd lines and secondly on the even lines, although with a time delay between the two and therefore some apparent movement having taken place between the odd and even lines. The two signals are called fields and a pair of fields comprises a frame.

In many applications it is desirable to transmit a video signal on successive lines of the display. This is called a progressive scan display and the process of converting a pair of fields into a full resolution progressive scan frame is called deinterlacing.

When deinterlacing, problems can arise because the pair of frames which are used to produce a progressive scan frame have a time delay between them. Therefore, motion can have taken place in the image between the frames and this can lead to unsightly visual artefacts if the fields are simply combined.

Motion compensation deinterlacers attempt to model the motion that is occurring in the scene and to make adjustments to reduce these unsightly visual artefacts. If an odd field is being deinterlaced and the motion in that field is accurately predicted then the previous even field can be moved forward in time to $T_0$, the time of the odd field to create a complete non-interlaced frame for $T_0$. The movement forward in time is performed on a per pixel basis.

Figure 1:
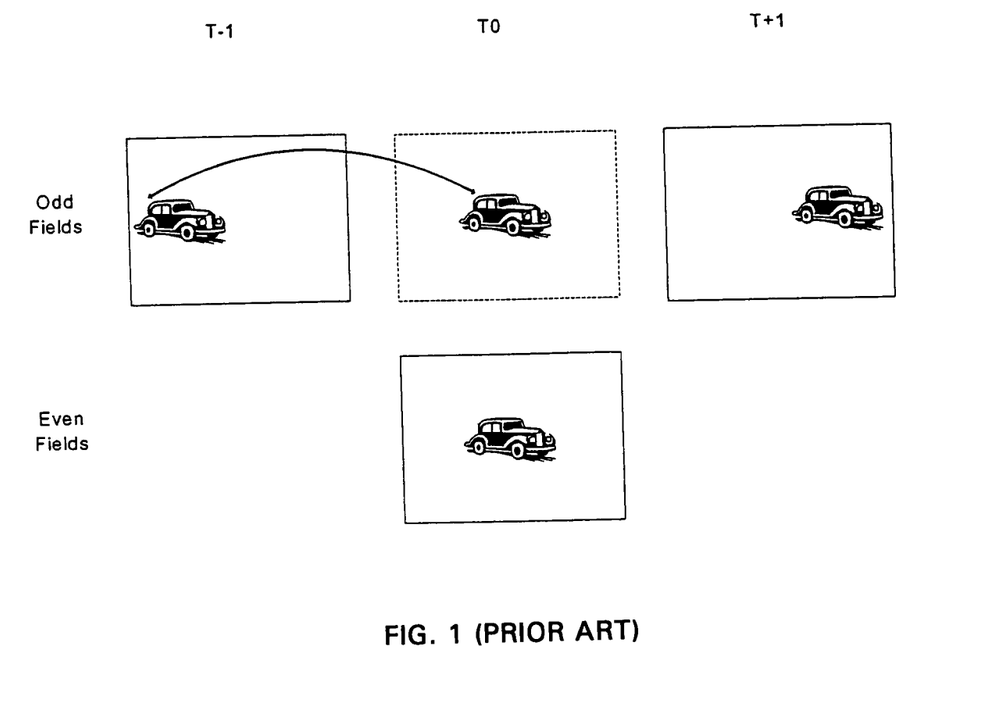
FIG. 1 shows a sequence of fields as discussed above.

FIG. 1 shows three input fields. These are odd input fields at time $T_{-1}$ and $T_{+1}$ and an even field at $T_0$. In order to produce a non-interlaced frame at $T_0$ it is necessary to create the odd field shown with a dotted outline at $T_0$. This field has to be reconstructed by motion compensation. If the motion of the car in the scene is known then the odd field at $T_0$ can be derived directly from $T_{-1}$, thereby enabling the full frame at $T_0$ to be constructed.

Deinterlacers are commonly used for displaying video data on progressive scanned displays such as liquid crystal displays and plasma displays. These are increasingly used for televisions and with the advent of mobile communication devices sending video data the use of deinterlaced video has become more common.

Motion compensation deinterlacers produce a good quality of image if the motion in the scene can be correctly modelled. Known motion compensation deinterlacers are restricted to modelling certain types of motion. These are usually two dimensional translations of objects from one part of the scene to another. When a video sequence has motion that cannot be so simply modelled such as scaling, reveals, or occlusions, known deinterlacers produce very poor visual results. We have appreciated that if it is possible to detect when a motion compensated deinterlacer is performing badly, a more robust form of deinterlacing may be switched in. This places an acceptable lower limit on the quality of the output signal but keeps the high quality from simple modelling when the motion is modelled correctly.

One improved form of protection is known as the Median filter and is described in European Patent Application No. EP-A-0192292. The basic principle of this is that a reconstructed pixel should have its colour values lying somewhere between the colour values of the physically adjacent pixels. This is a relatively poor solution because it removes detail from the scene and introduces aliasing.

Figure 2:
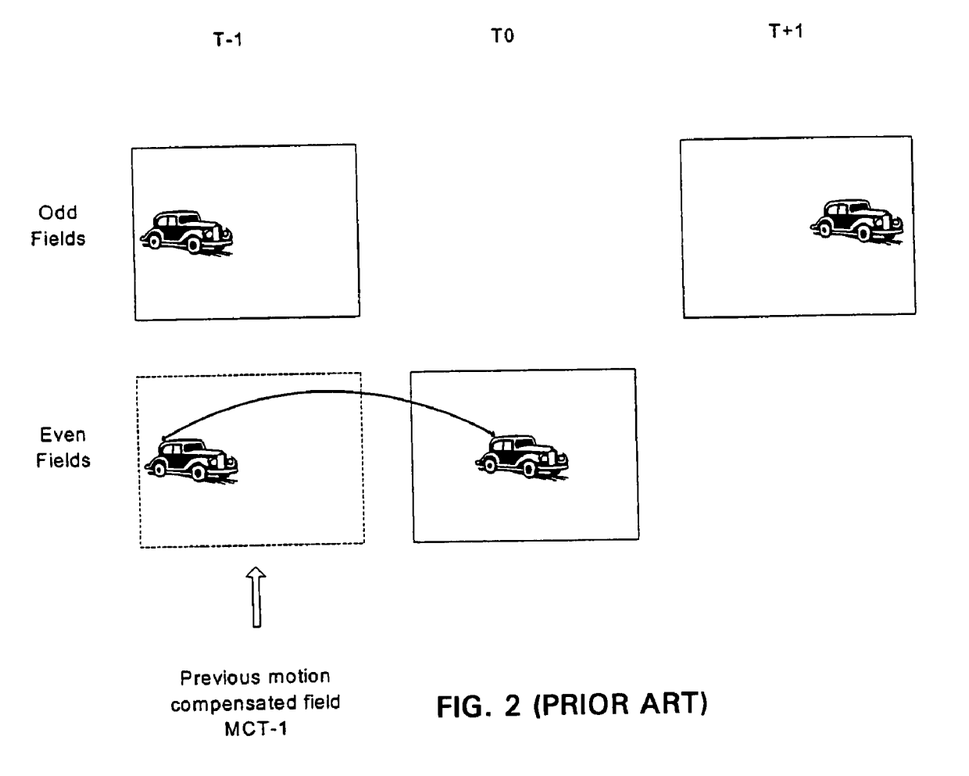
FIG. 2 shows a further sequence of fields as discussed above.

A more sophisticated scheme moves a previously reconstructed field using a current motion vector and compares this with the current field. Such a scheme is illustrated in FIG. 2 in which odd input fields are shown at times $T_{-1}$ and $T_{+1}$ as in an even input field at $T_0$. The dotted even field at $T_{-1}$ is the previous result of motion compensation. With a correct motion vector between $T_{-1}$ and $T_0$ there will be a close match between the pixels of the input field at $T_0$ and the motion compensated previously reconstructed field. With an incorrect motion vector it is likely there will be a poor match between $T_0$ and the reconstructed field. Therefore, this comparison can be used as an indication as to how well the motion compensation is performing. This comparison is referred to as $T_{-1}T_0$ confidence. A common method of determining how close the match is between two blocks of pixels is a Sum of Absolute Differences (SAD). The colour values of two pixels are subtracted one from the other and the absolute value of the result is calculated. This is the sum over the area of the image in question. So if the two blocks of pixels are identical, the SAD result is zero. One preferred embodiment of the present invention uses the SAD of the pixel's luminance. However, the present invention is not restricted to any particular method of matching pixels.

Using a $T_{-1}T_0$ confidence measure does in some circumstances fail. An incorrect motion vector can leave an incorrect motion compensated field and produce a close match with $T_0$. Such an effect can result in what are known as combing artefacts.

Preferred embodiments of the present invention seek to expand on the idea of using a confidence measure by combining two forms of confidence to produce a more robust measure of how well motion compensation is performing when converting from an interlaced into a deinterlaced signal. The second confidence measure is referred to in the embodiment which will be described as "$T_{-1}T_{+1}$" confidence. Preferably this is a measure of how closely a number of pixels match at $T_{-1}$ compared to $T_{+1}$ once they have been moved by the selected motion vector.

A preferred embodiment of the invention will now be described in detail by way of example with reference to the accompanying drawings in which.

Figure 4:
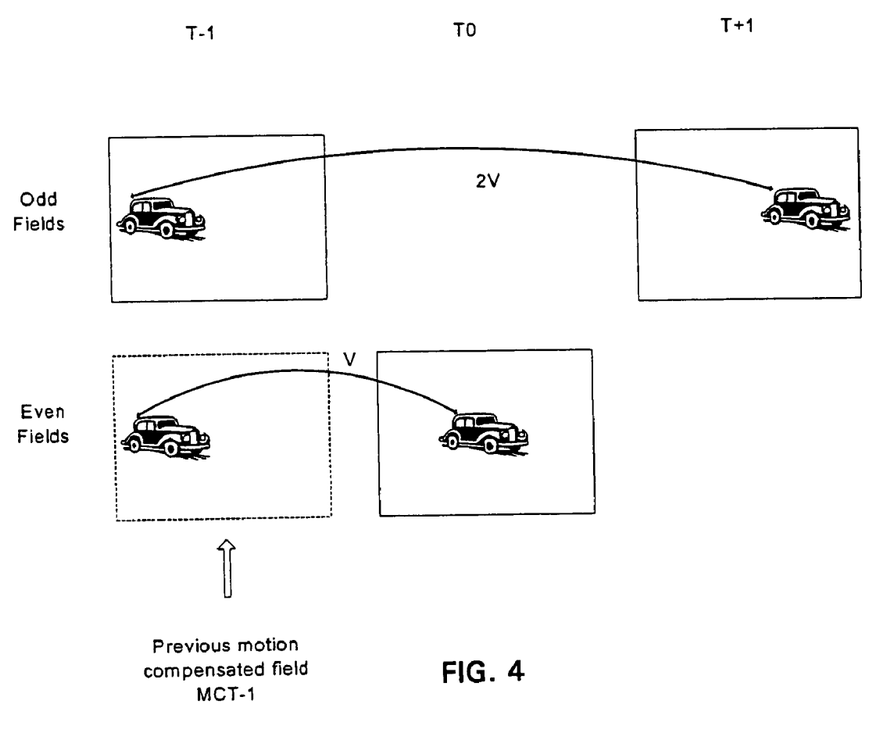
FIG. 4 shows a sequence of fields that would be derived in an embodiment of the invention.

In FIG. 4 the effect of an embodiment of the invention can be seen. A vector V represents the difference in position between pixels in a previous motion compensated field $MCT_1$ and an even field at $T_0$. This is used to derive the $T_{-1}T_0$ confidence measure. This is derived by detecting differences in a pixel in $MCT_{-1}$ shifted by the vector V to a new position in even field $T_0$. A correlation between the previous motion compensated pixel and the actual pixel is performed to determine how closely it matches the new pixel. Motion vectors for all pixels can then be correlated with their shifted pixels in frame $T_0$ and an overall correlation value determined on which $T_{-1}T_0$ confidence is based.

Figure 5:
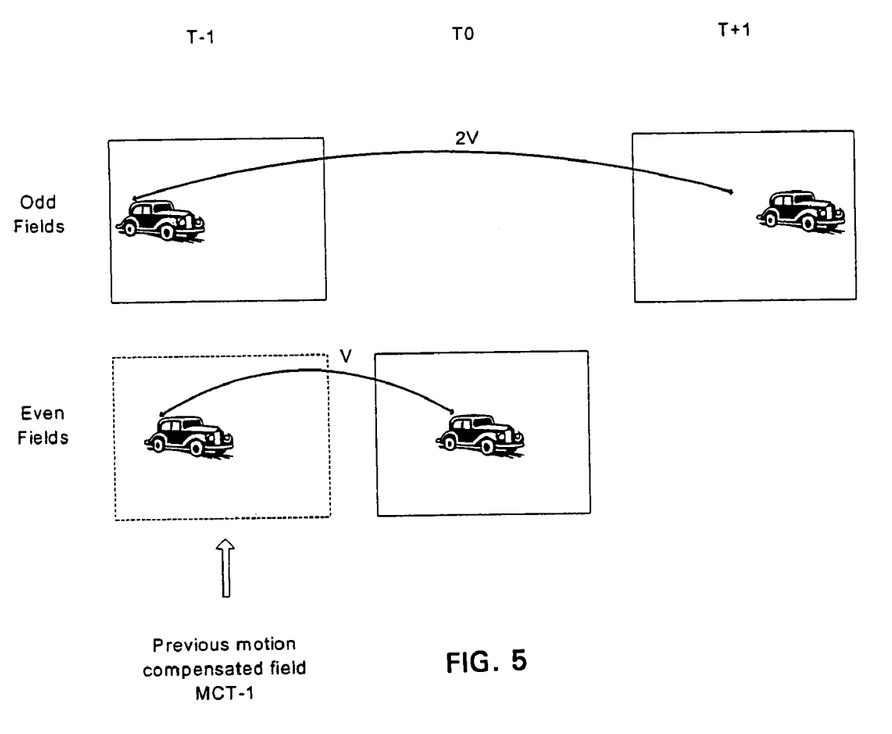
FIG. 5 shows a further sequence of fields that would be derived in an embodiment of the invention.

The same motion vector multiplied by 2 (2V) is then used to compare pixels in the odd input fields at $T_{-1}$ and $T_{+1}$. A further correlation is made to determine how well the pixels at $T_{+1}$ match those at $T_{-1}$ when shifted by the respective vectors used for each pixel in the fields. This is illustrated in FIG. 5. The correlation between $T_{-1}$ and $T_{+1}$ is used to derive the $T_{-1}T_{+1}$ confidence measure.

Figure 3:
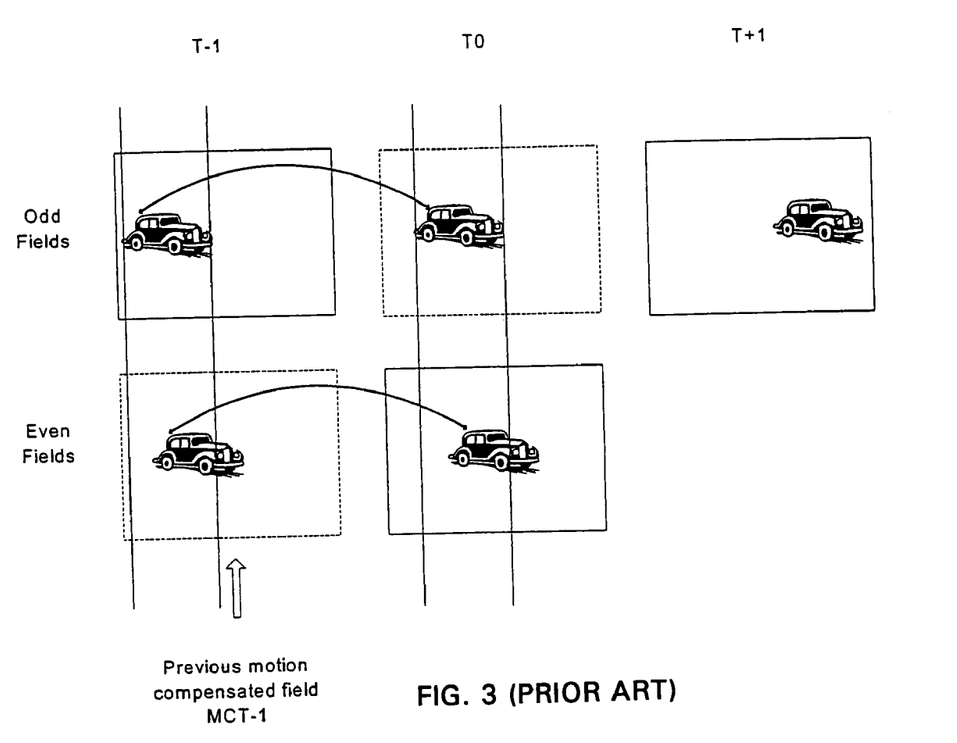
FIG. 3 shows a further sequence of fields as discussed above.

FIG. 5 continues the example of FIG. 3 when an incorrect motion compensated field $MCT_{-1}$ was derived. This gave an incorrect short vector V. This in fact gives an incorrectly good match for $T_{-1}T_0$ confidence. This suggests that the speed of the motion of the object shown was not linear. However, when twice the incorrectly short vector is used to compare input fields $T_{-1}T_{+1}$ a poor match is found. This is shown in FIG. 5 where the vector 2V falls short of the position of the object in fields $T_{+1}$.

Once the two confidence measures have been evaluated, they can be combined and a decision made as to whether or not a different deinterlacer needs to be used to produce the progressive scan signal. In one arrangement, a different deinterlacer can be switched in in the event that the least confident of the two values falls below a predetermined limit. Another route is to sum the two values and if the sum falls between a predetermined limit to switch to a different deinterlacer. Another route is to find the maximum of these two values, and use this to linearly interpolate between the motion compensation result and a different deinterlacer. However, the present invention is not restricted to any particular method of combining the confidences.

Figure 6:
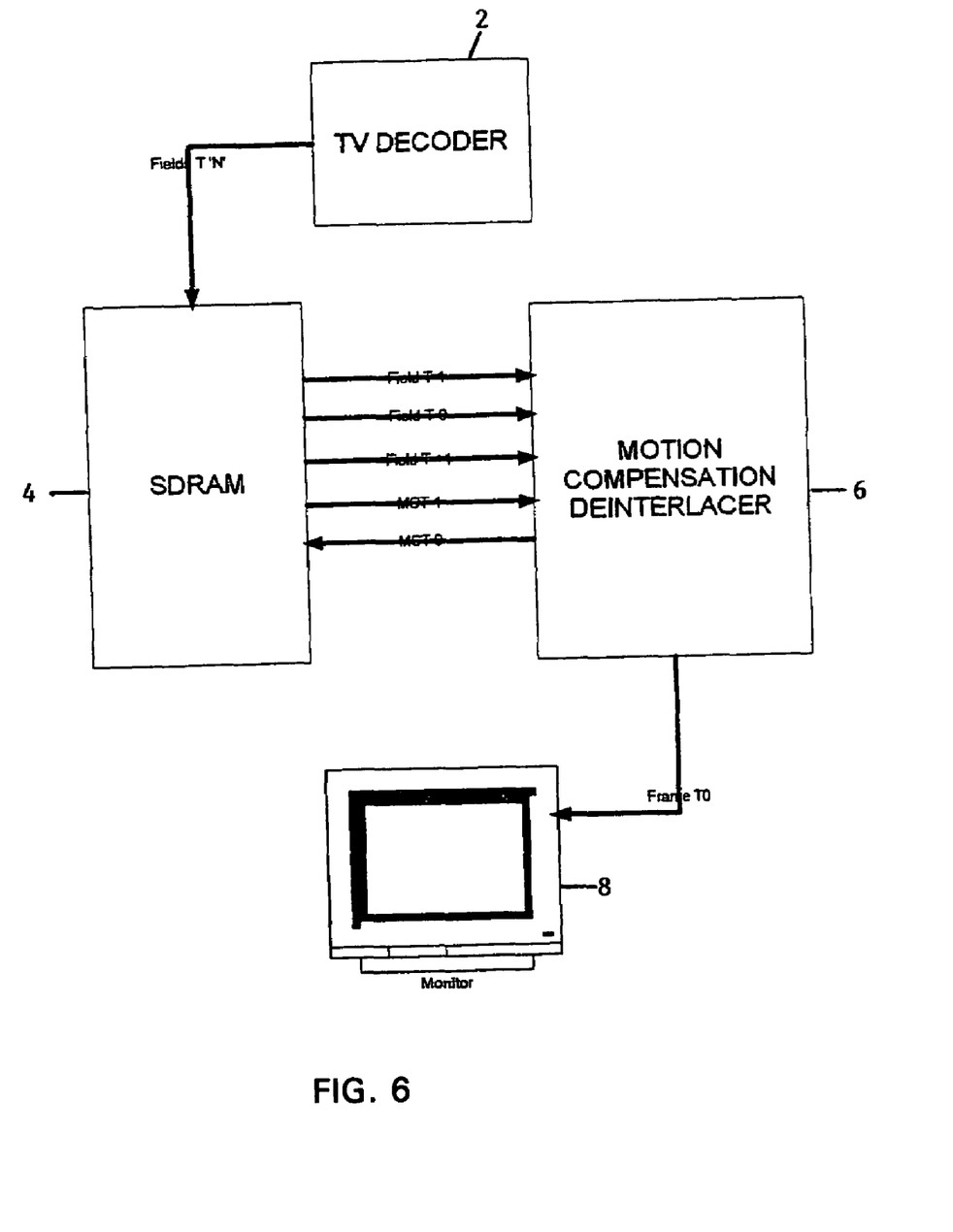
FIG. 6 shows a block diagram of an embodiment of the invention.

In FIG. 6 a TV decoder 2 is shown receiving a video signal and providing alternate odd and even fields to an DRAM memory 4. This stores a sequence of fields which may be operated on by a motion compensation deinterlacer 6 embodying the invention. Successive fields are provided by the SDRAM 4 to the motion compensation deinterlacer. In this example three fields are provided, namely field $T_{-1}$, field $T_0$, and field $T_{+1}$. As further fields are provided, field $T_{-1}$ will become field $T_0$, field $T_0$ will become field $T_{+1}$, old field $T_{+1}$ will be discarded and a new field $T_{-1}$ will be input.

The motion compensation deinterlacer produces a motion compensated field $MCT_{-0}$ which is combined with current field $T_0$ and output to a monitor or other device 8. This field is also referred back to the SDRAM 4 from where it is subsequently provided back to the motion compensation deinterlacer as a motion compensated field $MCT_{-1}$.

Figure 7:
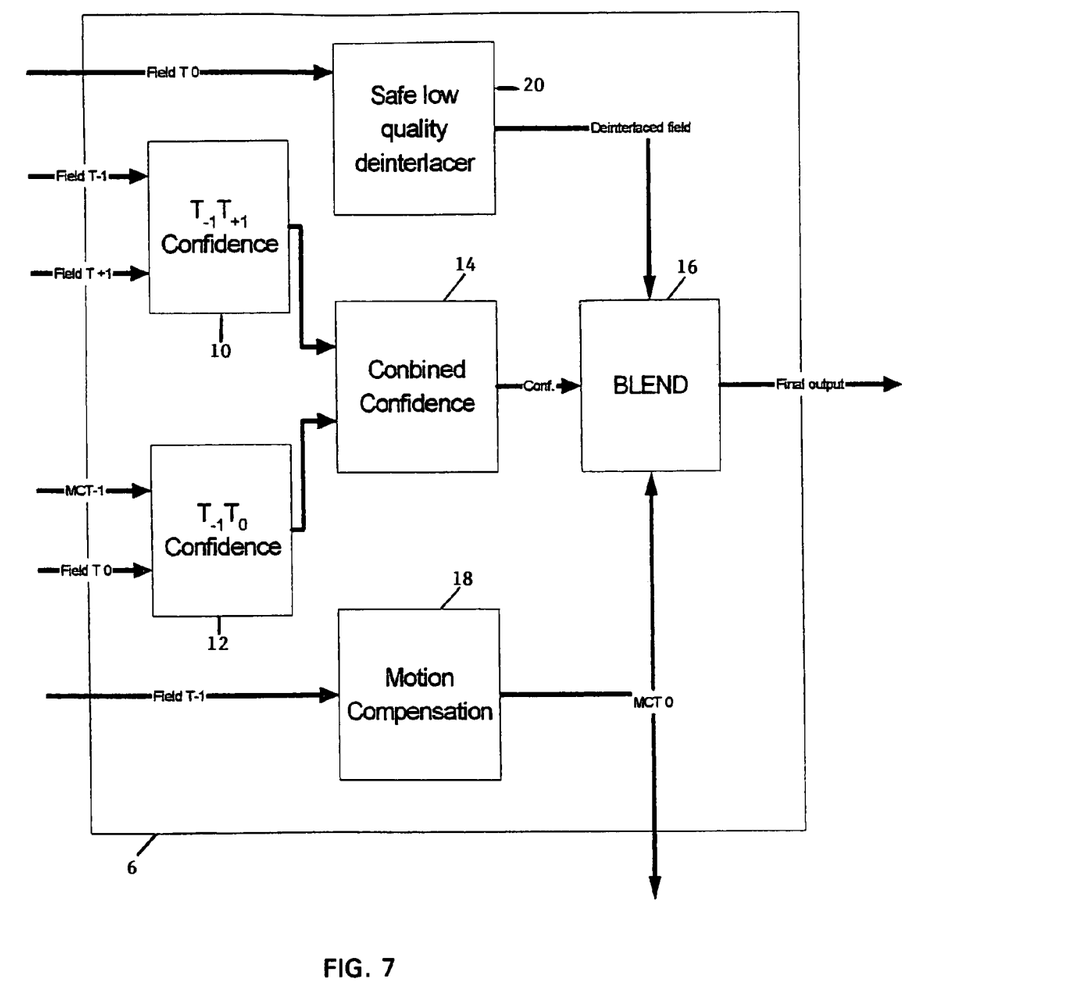
FIG. 7 shows a block diagram of the motion compensation deinterlacer of FIG. 5.

A block diagram of the motion compensation deinterlacer is shown in FIG. 7.

As can be seen, $T_{-1}T_{+1}$ confidence unit receives field $T_{-1}$ and field $T_{+1}$ and shifts each pixel in $T_{-1}$ by a vector 2V to give to give $MCT_{+1}$. The fields $T_{+1}$ and $MCT_{+1}$ are then correlated to determine how well they match and a confidence measure derived. The reverse process could be applied by shifting each pixel in $T_{+1}$ by a vector −2V to give $MCT_{-1}$ and then correlating this with field $T_{-1}$ to give a confidence measure. Similarly, motion compensated (which is a motion compensated version of $T_{-1}$) field $MCT_1$ and field $T_0$ are received by $T_{-1}T_0$ confidence unit which shifts pixels $MCT_{-1}$ by a previously derived vector V to determine how well they match the pixels in field $T_0$.

The two confidence measures are then combined in a combined confidence unit 14 which is used to control a blending unit 16. This blending unit receives fields $T_1$ and performs motion compensation on this in unit 18. At the same time, $T_0$ is received by a safe low quality deinterlacer 20 for use when the confidence measures are not sufficiently high to enable normal motion compensation to be used. A blend unit 16 is controlled by the combined confidence measure unit 14 to determine the proportions of the signals from the basic motion compensation unit 18 and the safe low quality deinterlacer 20 to use to produce a final output. A preferred embodiment uses linear interpolation to blend between the two signals, but the invention is not restricted to linear interpolation and a simple switch between the two signals could be used.

The output of the motion compensation unit 18 is field $MCT_0$ which is derived from a shifted version of field $T_{-1}$. This field $MCT_0$ is also output back to the SDRAM 4. The final output produced by the blending unit 16 is sent to a monitor 8 as shown in FIG. 6.

In alternative embodiments, the motion vectors used may be derived from a number of different fields. Also, more than two confidence measures may be used. The number used could be made to be dependent on picture quality. Also, the motion compensated field $MCT_0$ could be derived from field $T_{+1}$ rather than the $T_{-1}$ by axis on inverse motion vector or could be derived from a number of fields.

The invention claimed is:

1. A motion compensation deinterlacer for producing a progressive scan signal from an interlaced signal comprising:
    (a) a motion compensation unit for deriving missing lines in an interlaced field from at least one other field in the interlaced signal;
    (b) means for deriving a first confidence measure for the accuracy of the motion compensation unit using known lines of the field for which the missing lines are to be derived;
    (c) means for deriving a second confidence measure for the accuracy of the motion compensation unit using known lines of at least two other fields;
    (d) means for combining the first and second confidence measures; and
    (e) means for selecting outputs for display from at least the motion compensation unit and one other deinterlacing means in dependence on the combined confidence measure.

2. A motion compensation deinterlacer according to claim 1, including means for switching to a different deinterlacing means in dependence on the result of the combined confidence measure.

3. A motion compensation deinterlacer according to claim 2, in which the different deinterlacing means is switched into use if one of the confidence measures falls below a predetermined value.

4. A motion compensation deinterlacer according to claim 2, in which the means for switching to the different deinterlacing means comprises a blending unit which proportions the output of the motion compensation unit and one or more of the deinterlacing means to produce the outputs comprising a deinterlaced signal.

5. A motion compensation deinterlacer according to claim 1, including means for determining a motion vector, and wherein the means for deriving a first confidence measure utilizes the motion vector.

6. A motion compensation deinterlacer according to claim 1, including means for determining a motion vector, and wherein the means for deriving a second confidence measure utilizes the motion vector.

7. A motion compensation deinterlacer according to claim 1, wherein the first confidence measure is based on how accurately the motion compensation means predicted pixels in a current field in comparison to actual pixel values.

8. A method for motion compensation deinterlacing for producing a progressive scan signal from an interlaced signal comprising the steps of:
   (a) deriving missing lines in an interlaced field from at least one other field in the interlaced signal by motion compensation;
   (b) deriving a first confidence measure for the accuracy of the motion compensation using known lines of the interlaced field for which missing lines are to be derived;
   (c) deriving a second confidence measure for the accuracy of the motion compensation using known lines of at least two other fields;
   (d) combining the first and second confidence measures to obtain a combined confidence measure; and
   (e) selecting outputs for display from at least the motion compensation and one other deinterlacing means in dependence on the combined confidence measure.

9. A method according to claim 8, including the step of switching to a different deinterlacing means in dependence on the result of the combined confidence measures.

10. A method according to claim 9, including the step of switching to the different deinterlacing means when one of the confidence measures falls below a predetermined value.

11. A method according to claim 9, in which the step of switching to the different deinterlacing means comprises the step of blending proportions of the motion compensation and one or more of the deinterlacing means to produce the outputs for an output deinterlaced signal.

12. A method according to claim 8, including the step of determining a motion vector, and wherein the step of deriving a first confidence measure utilizes the motion vector.

13. A method according to claim 8, including the step of determining a motion vector, and wherein the step of deriving a second confidence measure utilizes the motion vector.

14. A method according to claim 8, wherein the first confidence measure is based on how accurately the motion compensation predicts pixels in a current field in comparison to actual pixel values.

15. A method for motion compensation deinterlacing for producing a progressive scan signal from an interlaced signal comprising the steps of:
   determining safe outputs with a safe deinterlacer;
   deriving motion compensation outputs;
   deriving motion vectors;
   deriving a first confidence measure from known lines of at least one of the fields and the motion vectors;
   deriving a second confidence measure from known lines of at least two other ones of the fields and the motion vectors;
   combining the first and second confidence measures to obtain a combined confidence measure; and
   selecting outputs for the progressive scan signal from at least the motion compensation outputs and the safe outputs of the safe deinterlacer in dependence on the combined confidence measure.

16. A method according to claim 15, wherein the motion vectors are derived from differences in position between pixels in a previous motion compensation field and another field.

17. A method according to claim 15, wherein the motion vectors are derived from a number of the different fields.

18. A method according to claim 15, wherein the step of selecting outputs comprises switching from the motion compensation outputs to the safe interlacer outputs when one of the confidence measures falls below a predetermined value.

19. A method according to claim 15, wherein the step of selecting outputs further comprises the step of blending proportions of the motion compensation outputs and the safe outputs in dependence on the combined confidence measure.

* * * * *

UNITED STATES PATENT AND TRADEMARK OFFICE
CERTIFICATE OF CORRECTION

PATENT NO. : 7,505,080 B2
APPLICATION NO. : 10/953332
DATED : March 17, 2009
INVENTOR(S) : Leaback It is certified that error appears in the above-identified patent and that said Letters Patent is hereby corrected as shown below:

The title page showing the illustrative figure should be deleted to be replaced with the attached title page.

On the title page please insert:
--(30) Priority Document Data
  United Kingdom Application No. 0404682.7, filed March 2, 2004--.

The drawing sheet, consisting of Fig. 7, should be deleted to be replaced with the drawing sheet, consisting of Fig. 7, as shown on the attached page.

Signed and Sealed this

Ninth Day of March, 2010

David J. Kappos
*Director of the United States Patent and Trademark Office*

(12) United States Patent
Leaback (10) Patent No.: US 7,505,080 B2
(45) Date of Patent: Mar. 17, 2009

(54) MOTION COMPENSATION DEINTERLACER PROTECTION

(75) Inventor: Peter David Leaback, London (GB)

(73) Assignee: Imagination Technologies Limited, Kings Langley, Hertfordshire (GB)

( * ) Notice: Subject to any disclaimer, the term of this patent is extended or adjusted under 35 U.S.C. 154(b) by 432 days.

(21) Appl. No.: 10/953,332

(22) Filed: Sep. 29, 2004

(65) Prior Publication Data
US 2005/0206786 A1 Sep. 22, 2005

(51) Int. Cl.
H04N 7/01 (2006.01)
H04N 11/20 (2006.01)
H04N 5/14 (2006.01)
H04N 9/64 (2006.01)

(52) U.S. Cl. .................... 348/452; 348/448; 348/699

(58) Field of Classification Search ................ 348/448, 348/451, 452, 699
See application file for complete search history.

(56) References Cited

U.S. PATENT DOCUMENTS

| | | | | |
|---|---|---|---|---|
| 5,600,377 A * | 2/1997 | David et al. | ................. | 348/452 |
| 5,610,662 A * | 3/1997 | Hackett | ................. | 348/452 |
| 5,619,272 A | 4/1997 | Salmon et al. | | |
| 5,642,170 A * | 6/1997 | Hackett et al. | ................. | 348/459 |
| 5,661,525 A * | 8/1997 | Kovacevic et al. | ................. | 348/452 |
| 5,784,114 A * | 7/1998 | Borer et al. | ................. | 348/452 |
| 5,943,099 A * | 8/1999 | Kim | ................. | 348/448 |
| 5,995,154 A * | 11/1999 | Heimburger | ................. | 348/448 |
| 6,141,056 A * | 10/2000 | Westerman | ................. | 348/448 |
| 6,262,773 B1 * | 7/2001 | Westerman | ................. | 348/448 |
| 6,414,719 B1 * | 7/2002 | Parikh | ................. | 348/448 |
| 6,421,090 B1 * | 7/2002 | Jiang et al. | ................. | 348/452 |
| 6,442,203 B1 * | 8/2002 | Demos | ................. | 375/240.16 |
| 6,459,455 B1 * | 10/2002 | Jiang et al. | ................. | 348/452 |
| 6,501,794 B1 * | 12/2002 | Wang et al. | ................. | 375/240.08 |
| 6,519,369 B1 * | 2/2003 | Kondo et al. | ................. | 382/261 |
| 6,532,264 B1 * | 3/2003 | Kahn | ................. | 375/240.16 |
| 6,577,345 B1 * | 6/2003 | Lim et al. | ................. | 348/452 |
| 6,614,485 B2 * | 9/2003 | Shin et al. | ................. | 348/452 |
| 6,822,691 B1 * | 11/2004 | Kim et al. | ................. | 348/452 |
| 6,924,844 B2 * | 8/2005 | Kawamura et al. | ................. | 348/448 |

(Continued)

FOREIGN PATENT DOCUMENTS

EP 0192292 A1 8/1986

(Continued)

OTHER PUBLICATIONS

United Kingdom Search Report dated Jul. 21, 2004 (5 pages).

*Primary Examiner*—Brian P Yenke
(74) *Attorney, Agent, or Firm*—Flynn, Thiel, Boutell & Tanis, P.C.

(57) ABSTRACT

A motion compensation deinterlacer for producing a progressive scan signal from an interlaced signal includes a motion compensation unit that derives missing lines in an interlaced field from at least one other field in the interlaced signal. The deinterlacer includes a device that derives a first confidence measure for the accuracy of the motion compensation unit using known lines of the field for which missing lines are to be derived. Another device derives a second confidence measure for the accuracy of the motion compensation unit using known lines of at least two other fields. The first and second confidence measures are combined. An output unit selects outputs for display from at least the motion compensation unit and one other deinterlacing device in dependence on the combined confidence measures.

19 Claims, 7 Drawing Sheets

Figure 7